United States Patent [19]

Sittardt et al.

[11] 4,329,319

[45] May 11, 1982

[54] APPARATUS FOR EXTRACTING PULVEROUS OR GRANULAR MATERIAL

[75] Inventors: Hans-Günter Sittardt, Aachen; Matthias Radke, Jülich, both of Fed. Rep. of Germany

[73] Assignee: Kernforschungsanlage Jülich Gesellschaft mit beschränkter Haftung, Jülich, Fed. Rep. of Germany

[21] Appl. No.: 153,414

[22] Filed: May 27, 1980

Related U.S. Application Data

[63] Continuation of Ser. No. 937,416, Aug. 28, 1978, abandoned.

[30] Foreign Application Priority Data

Aug. 27, 1977 [DE] Fed. Rep. of Germany ....... 2738739

[51] Int. Cl.$^3$ .................. B01D 11/02; B01F 7/00; B01F 15/02
[52] U.S. Cl. ..................................... 422/224; 422/234; 422/262; 422/269; 422/273; 422/281; 366/159; 366/176; 366/302
[58] Field of Search .............. 422/261, 269, 273, 281, 422/901, 902, 234, 262, 224; 366/159, 176, 302, 305

[56] References Cited

U.S. PATENT DOCUMENTS

| 2,817,500 | 12/1957 | Robinson | 366/176 |
| 3,194,540 | 7/1965 | Hager | 366/305 |
| 4,045,004 | 8/1977 | Berger | 366/159 |
| 4,182,749 | 1/1980 | Green et al. | 422/234 |

Primary Examiner—William F. Smith
Assistant Examiner—Chris Konkol
Attorney, Agent, or Firm—Becker & Becker, Inc.

[57] ABSTRACT

An apparatus for extracting pulverous or granular material from a mixture by means of a solvent brought into contact with the mixtue. A receptacle is provided for receiving the material to be extracted as well as the solvent. A conduit system is connected with the lower portion of the receptacle and empties into the upper portion of the receptacle. Within the conduit system is arranged a device for conveying the solvent to be withdrawn from the receptacle as well as the mixture containing the material to be extracted. The device also serves to mechanically form a dispersion of the material to be extracted in the solvent. The device includes a rotatable body operated at a speed of 10,000 to 30,000 rpm.

2 Claims, 6 Drawing Figures

APPARATUS FOR EXTRACTING PULVEROUS OR GRANULAR MATERIAL

This is a continuation of application Ser. No. 937,416—Sittardt et al. filed Aug. 28, 1978 (Monday), now abandoned.

The present invention relates to an apparatus for extraction of pulverous or granular material from a mixture by means of a solvent which is to be brought into contact with the mixture. A receptacle is provided for receiving the material to be extracted and the solvent which is to be brought into contact with the mixture.

During the extraction out of mixtures of solid material, for example stone, selected constituents are dissolved out of this mixture by means of a solvent. For this purpose, the starting material is first made smaller and is then brought into contact with the solvent. The extraction phase formed from the solvent and the material which went into solution as a result of contact with the solid phase is then filtered off from the solid phase. Subsequently, the extract is isolated out of the filtrated extract phase by being precipitated, crystallized, and distilled, and is then chemically analyzed.

Apparatus for extracting pulverous or granular material, such as mineral rock, are known. According to these apparatus, the material is brought into contact with a solvent, such as an organic solvent. In particular, the state of the art includes a so-called Soxhlet apparatus. With this apparatus, the previously pulverized material which is to be extracted is placed in a tube which allows the solvent which is to be used to pass through, yet does not allow the pulverous material to pass through. After being evaporated and subsequently condensed, the solvent is passed through the material introduced into the tube. In so doing, the solvent dissolves the material which is to be extracted out of the pulverous material and is again separated from the pulverous material by passing through the wall of the tube. However, a drawback to this apparatus consists in that the measures required for extraction thereby, require a considerable amount of time, since the solvent must continuously be repassed through the material which is to be extracted so that all the material which is to be analyzed is actually reliably dissolved. Only in this manner are all the requirements for a reliable analysis made possible.

A further drawback to using the known apparatus for extracting solid material consists in that the reproduceability of the results obtained is not assured. This is due to the fact that it is necessary to place the material which is to be tested in a tube and thus to layer it. As a result, the solvent cannot, or at least not in the desired manner, come into contact with the entire surface of the pulverized material, so that different values are obtained when the process is repeated.

A very important drawback with these known measures consists in that, due to the different boiling points, it is not possible to use non-azeotropic solvent mixtures. As a result, the range of application of the heretofore known measures with the use of the Soxhlet apparatus is limited.

It is therefore an object of the present invention to provide an apparatus which makes possible the complete extraction of pulverous material, for example, pulverized stone, within a short period of time. Additionally, the apparatus should be capable of a broad range of application with regard to the solvent or solvent mixture to be used.

It is a further object of the present invention that the apparatus be easy to manufacture, yet be able to produce reproduceable results over long periods of time.

These and other objects and advantages of the present invention will appear more clearly from the following specification in connection with the accompanying drawings, in which.

The apparatus of the present invention is characterized primarily in that a conduit system which empties into the upper portion of the receptacle is also connected with the lower portion of the receptacle. A device is arranged in the conduit system and is intended not only to convey the mixture formed of the solvent drawn off from the receptacle and the mixture which is to undergo extraction, but also to mechanically form a dispersion of the extracted material in the solvent. When using this specific embodiment of the apparatus, a high degree of dispersion of the pulverous material to be extracted is already achieved in the solvent or solvent mixture after a short period of time. As a result of the high degree of dispersion, complete contact of the entire surface of the pulverous material with the solvent or solvent mixture is achieved. As a result, the material to be extracted already passes into the solvent or solvent mixture after a very short operation of the apparatus.

A very advantageous manner of operation of the apparatus consists in driving the rotatable body at a speed between 10,000 and 30,000 rpm. A preferred speed for the rotatable body is about 20,000 rpm.

An important advantage with the use of the apparatus according to the present invention for the extraction of powdered stone consists in that it is at once possible to add pulverous copper to the receptacle to bond sulfur which may be contained in the pulverous material. As a consequence of turning the rotatable body, and the thus produced turbulence of the solid material in the solvent, the copper powder contains a practically oxide-free surface and is therefore able, under the given conditions, to react with the sulfur which may be present in such a way as to form copper sulfide. The outcome of the analytical testing of the solvent remaining after removal of the solid constituents, with the materials dissolved in this solvent, is therefore further improved.

Figure 1:
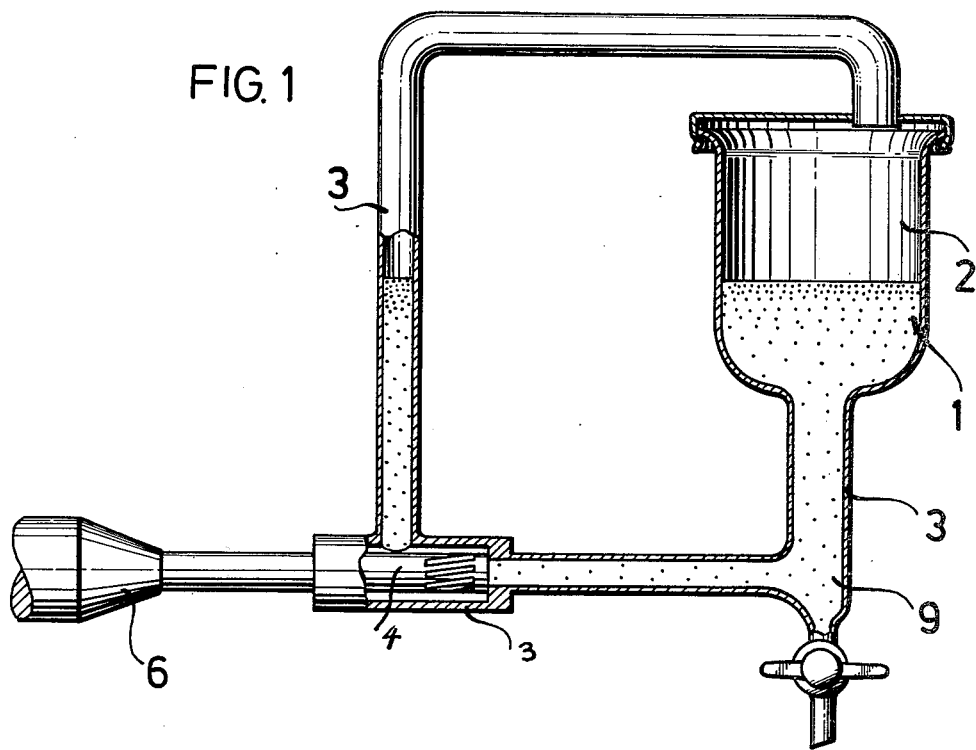
FIG. 1 shows the extraction apparatus of the present invention, partially in section and partially in view.
Figure 2:
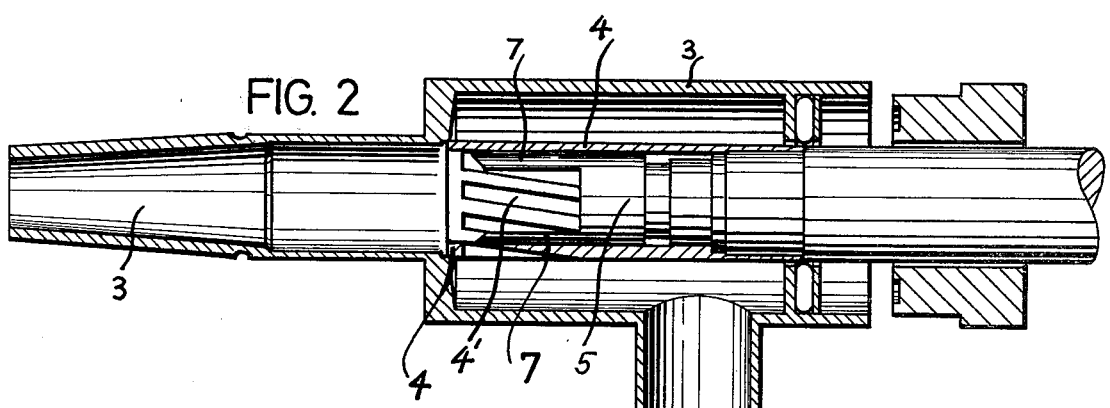
FIG. 2 is a longitudinal section through a portion of the conduit system as well as the housing, showing in view the rotatable body which is arranged therein and is provided for conveying the mixture of solvent and pulverous material to be extracted as well as for forming a dispersion in the solvent of the material which is to be tested.
Figure 3:
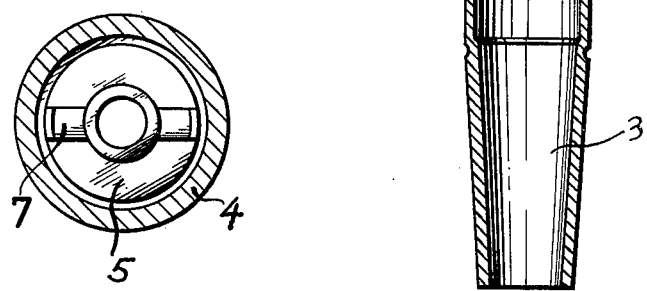
FIG. 3 is a section through the housing of FIG. 2, again showing the rotatable body in view.

Referring now to the drawings in detail, a receptacle 2 is provided for receiving the solvent 1 and the material which is to be tested. The bottom of the receptacle 2 is connected with one end of a downward vertical portion of a conduit system 3, the other end of which is connected to an upward vertical portion with a horizontal section which empties into the upper portion of the receptacle 2 above the upper surface formed by the pulverour material and the solvent. In that portion of the conduit system 3 which is located below the level of the solvent in the receptacle 2, there is provided a rotatable body 5 (best seen in view in FIG. 2) arranged in a housing 4, which essentially comprises a hollow cylinder or sleeve, the end face of which is open. As shown in FIG. 1, the rotatable body 5 is driven by a motor 6. A pair of horizontal, straight, parallel and spaced blades or vanes 7 are attached around the periphery of the rotatable body 5 in such a way that the mixture formed from the solvent and the pulverous material is sucked or drawn into the housing 4 through the end opening in the sleeve. The mixture is then pushed through outlet slot 4' into a tube coaxial with the sleeve and then into the vertical portion of the conduit system 3 which is located between the conveying/dispersion device 4, 5 and the upper part of the receptacle 2, thus passing back into the receptacle 2 via a horizontal section of conduit which opens downwardly. In addition, a whirl effect results from the rotatable body 5 and the blades 7 arranged thereon, with the result that the pulverous material is dispersed in the solvent.

The outlet slots 4' are parallel with respect to one another but are inclined relative to the axis of the single cylindrical sleeve 4. The blades 7 of the rotor are straight so that the blades advance along the slots as the blades rotate. Moreover, the blades and rotor are confined within the sleeve or housing 4 and leave the space between the sleeve or housing 4 and tubular portion 3 (of FIGS. 1 and 2) unobstructed so that material forced into the space is subsequently pushed through the vertical tube which communicates with the space. In addition, since the blades 7 are straight and radially spaced from one another, the blades define a radial space therebetween into which the material in the horizontal tube is drawn before being pumped out of the slots 4' by rotation of the rotor 5 via the motor 6.

The outlet slots 4' are parallel with respect to each other and the blades of the rotor advance along the slots as the blades rotate. The slots 4' are located approximately longitudinally to one side with respect to the axis of the sleeve.

As shown in FIG. 1, a closable opening 9 is located below the receptacle 2 and is connected with the conduit system 3. The opening 9 is provided for the withdrawal of the dispersion formed in the extraction device. The opening 9 is attached in such a way that, or, if deemed necessary, the conduit system 3 at the location of the opening 9 is designed in such a way that, no undesired residue can remain in the conduit system 3 or the receptacle 2.

As shown in FIG. 1, the receptacle 2 is covered toward the top by a lid or an aluminum foil which still leaves the conduit free to enter the receptacle. The purpose of this cover is to prevent spattering or splashing from possibly escaping from the receptacle 2 onto the material to be tested during impact of the fluid stream which passes out of that end of the conduit system 3 which empties into the upper portion of the receptacle 2.

EXAMPLE 500 ml dichloromethane were introduced into the receptacle 2 of the extraction device. The drive motor 6 was started and the speed of the rotatable body 5 under load was adjusted to 19,600 rpm. In this connection, the conveying capacity was determined to be 14.8 l/min. 100 g of pulverized Posidonien slate having a granule size of less than 150 μm, and 1 g of fine copper powder, were added to the now flowing solvent. After 10 minutes, the suspension was removed through the opening 9, and the solvent was separated from the solid constituents by means of centrifuging. The solvent was evaporated, and the quantity of extract was gravimetrically determined. Pursuant to further tests, the measured amount of extract remained practically constant even during repeated employment of the described measures with the same stones.

Figure 4:
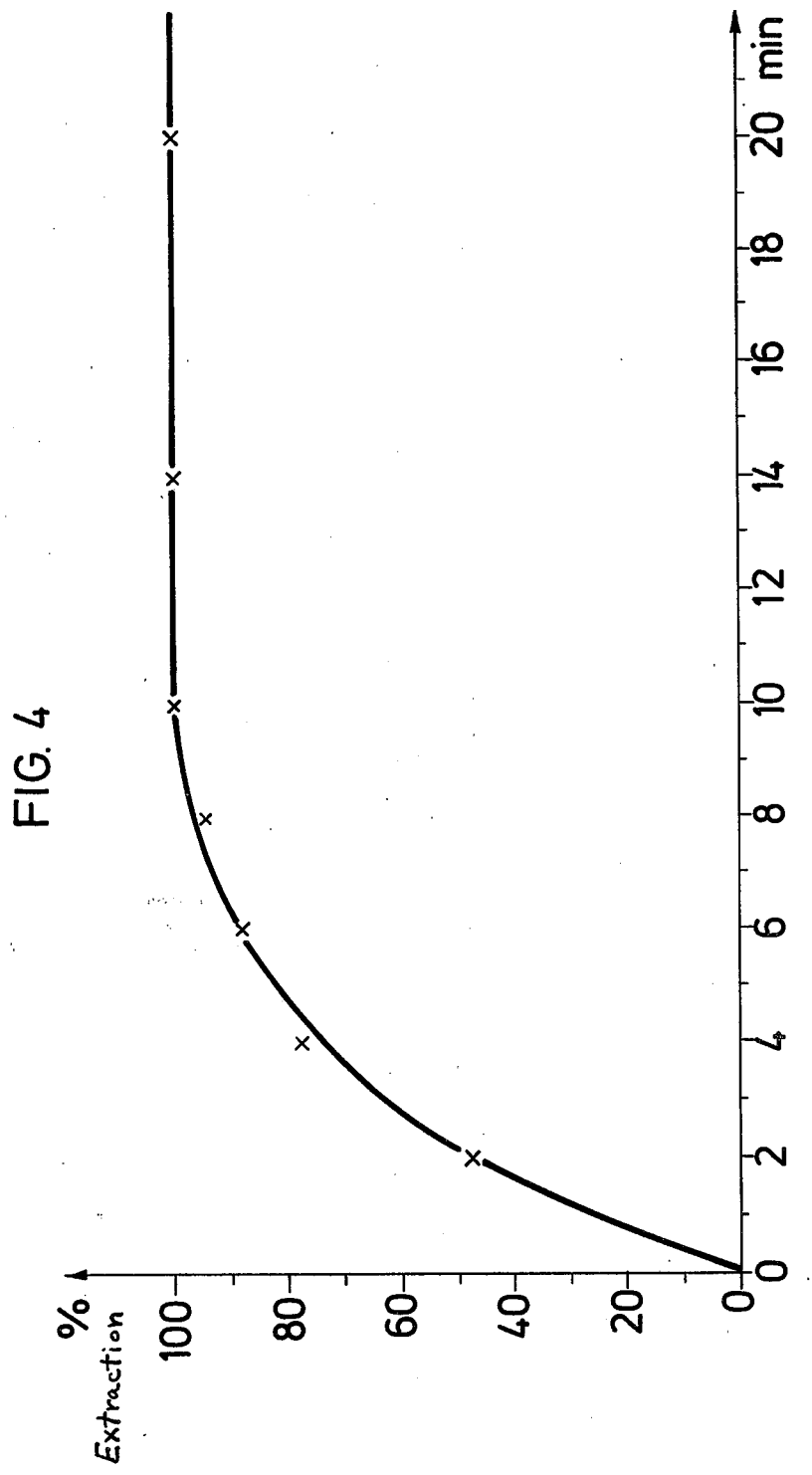
FIG. 4 is a graph showing the time dependency of the degree of extraction of the pulverized stone.

As shown in FIG. 4, to establish the optimum extraction time, the dependence of the extract yield to the duration of the extraction was determined. As shown in the graph, a complete extraction of the material involved in the subject extraction was already achieved within 10 minutes.

Figure 5:
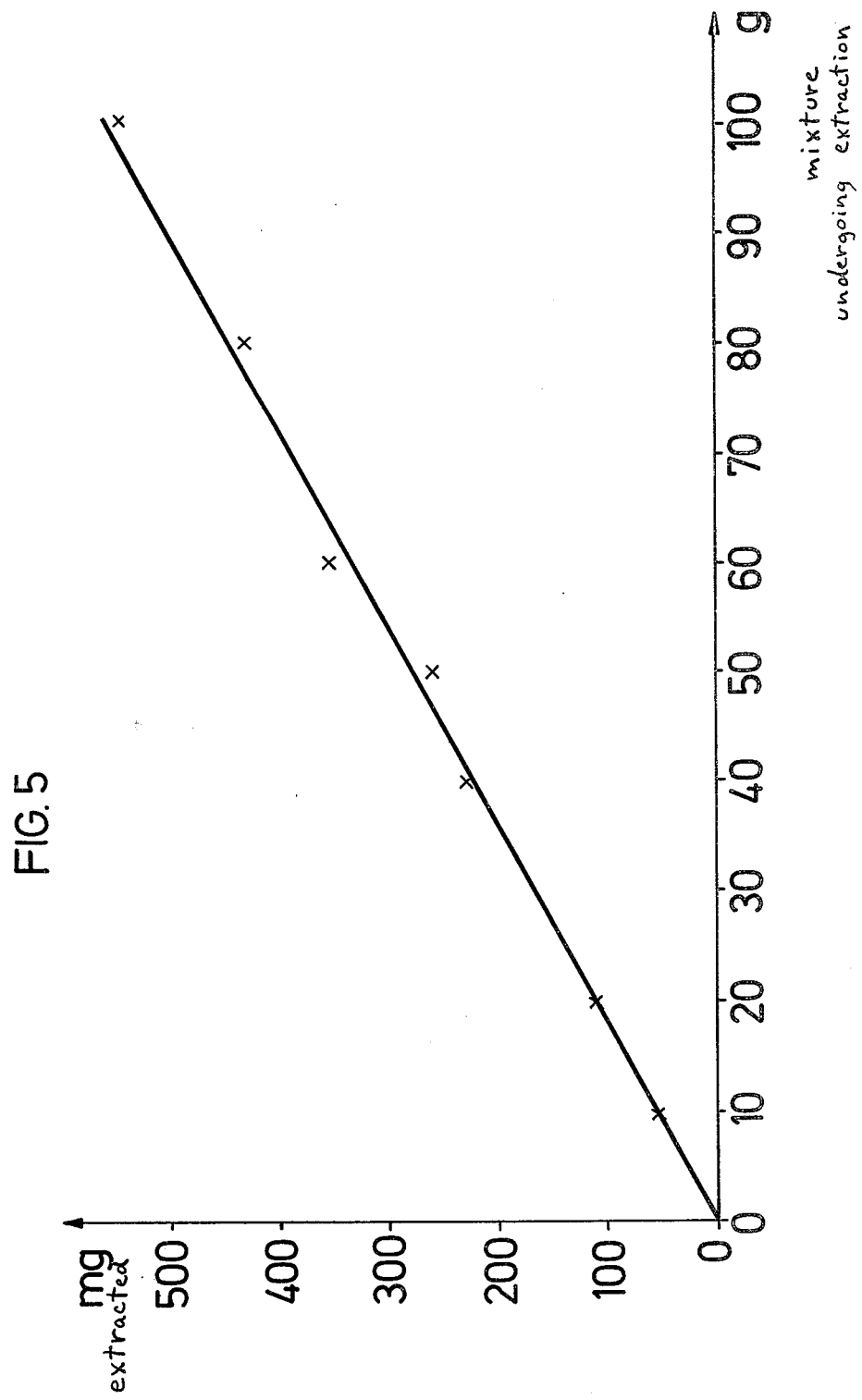
FIG. 5 is a graph showing the extraction of different quantities of a powdered stone.

FIG. 5 illustrates the results of another series of experiments in which the quantity extracted from the amount of the test sample which was to undergo the extraction was determined. As shown in the graph, with a previously described extraction time of 10 minutes, the dependence is quite linear. This supports the completeness of the extraction.

Figure 6:
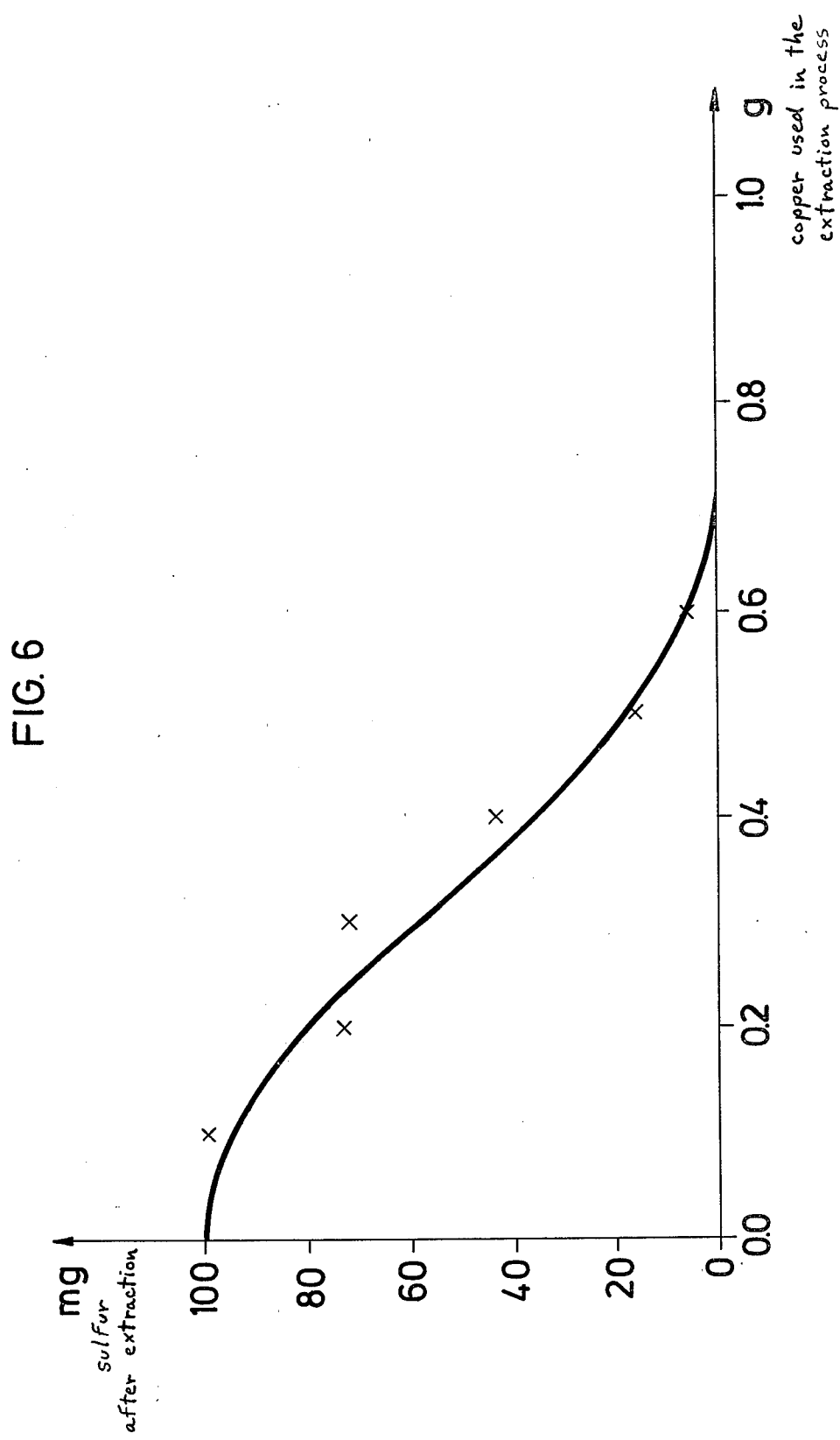
FIG. 6 is a graph showing the dependency of the bonding of sulfur contained in the material to be extracted with powdered copper.

In addition, the bonding capacity of the copper for elemental sulfur was determined. For this purpose, 100 mg sulfur was added to 20 g test samples of a preextracted, pulverized carbonate stone having granule sizes of less than 150 μm. Copper powder was added to this mixture in various amounts, and the various formed mixtures were extracted for 10 minutes. The quantities of elemental sulfur were UV-photometrically determined after the extraction. The results are reproduced in FIG. 6, which shows that the bonding capacity of the copper was determined to be 150 mg sulfur per gram copper.

The present invention is, of course, in no way restricted to the drawings or the example, but also encompasses any modifications within the scope of the appended claims.

What is claimed is:

1. An apparatus specifically for forming a mixture consisting of a dispersion of pulverized mineral rock and copper powder in a solvent in order to extract sulfur from the pulverized mineral rock, the apparatus comprising:
    a receptacle of a relatively large diameter for containing pulverized rock sulfur powder and a solvent, said receptacle having an openable top for filling the container with the mixture and an opening in the bottom for removing the mixture from the receptacle;
    a vertically extending conduit connected to the opening in the bottom of the receptacle;
    a horizontal extension on the vertical conduit;
    a valve aligned with and connected to the conduit at a location beneath the horizontal extension for draining the apparatus of the mixture:
    an agitator connected to the horizontal conduit, the agitator comprising: a single, cylindrical sleeve having an inlet registered axially with the horizontal conduit and a plurality of spaced outlet slots positioned radially through the sleeve, the outlet slots being parallel with one another and being inclined relative to the axis of the cylindrical sleeve;

a rotor combined within the sleeve, the rotor having a pair of opposed straight blades radially spaced from one another to define a radial space therebetween and extending parallel with the axis of the sleeve and in close proximity with respect to the outlets substantially along the entire length of the outlets;

a motor for rotating the rotor at a speed of approximately 20,000 rpm in a direction which advances the blades along the slots;

a tube surrounding the sleeve in coaxial relation with respect thereto and communicating with only the outlets of the sleeve for receiving the mixture pulled through the inlet of the sleeve and ejected through the outlets of the sleeve by rotation of the blades; and a return conduit extending vertically upward and normal with respect to the extent of the tube for receiving the mixture from the tube, said return conduit having a horizontal section extending over the receptacle and a vertical outlet extending through the receptacle cover for returning the mixture to the receptacle for recycling, whereby the sulfur is bonded to the copper powder for subsequent removal from the pulverized rock after being drained from the apparatus.

2. Apparatus for extracting pulverous and granular material from a mixture by means of a solvent brought into contact with the mixture, the apparatus comprising:

a container having an upper and lower end for receiving the material and the solvent to be brought into contact therewith;

a duct system leading from the lower end of the container and emptying into the upper end of the container;

a pump disposed in the duct system, the pump comprising an axially extending outer chamber having an axially opening inlet connected to the duct and a radially opening outlet connected to the duct; a cylindrical housing surrounded by the chamber, the cylindrical housing having an axially opening inlet aligned with and connected to the duct and a plurality of radial slots axially extending therein, the slots being inclined with respect to the axis of the housing and opening into the chamber;

a rotary member with blades extending axially therefrom combined completely within the housing, the blades being radially spaced from one another and defining a radial space therebetween, the blades and slots having relative inclination with respect to one another in the axial direction, and means for rotating the rotary member of high speed whereby the solid material is whirled to a sufficient extent to expose free surfaces on the solid material to the solvent while being pumped through the duct system.

* * * * *